US010764629B2

(12) United States Patent
Cruz

(10) Patent No.: US 10,764,629 B2
(45) Date of Patent: Sep. 1, 2020

(54) SYSTEMS AND METHODS FOR SIMULTANEOUSLY DISPLAYING VIDEO CONTENT FROM MULTIPLE PROGRAMMING SOURCES

(71) Applicant: Echostar Technologies L.L.C., Englewood, CO (US)

(72) Inventor: Alan Cruz, Aurora, CO (US)

(73) Assignee: DISH Technologies L.L.C., Englewood, CO (US)

( * ) Notice: Subject to any disclaimer, the term of this patent is extended or adjusted under 35 U.S.C. 154(b) by 7 days.

(21) Appl. No.: 15/445,255

(22) Filed: Feb. 28, 2017

(65) Prior Publication Data
US 2018/0192115 A1   Jul. 5, 2018

Related U.S. Application Data

(60) Provisional application No. 62/440,787, filed on Dec. 30, 2016.

(51) Int. Cl.
*H04N 21/431* (2011.01)
*H04N 21/488* (2011.01)
*H04N 21/462* (2011.01)

(52) U.S. Cl.
CPC ....... *H04N 21/431* (2013.01); *H04N 21/4316* (2013.01); *H04N 21/4622* (2013.01); *H04N 21/4886* (2013.01)

(58) Field of Classification Search
None
See application file for complete search history.

(56) References Cited

U.S. PATENT DOCUMENTS

| 6,536,041 | B1 * | 3/2003 | Knudson | H04N 21/235 |
| | | | | 375/E7.024 |
| 8,629,939 | B1 * | 1/2014 | Freund | H04N 5/145 |
| | | | | 348/468 |
| 2004/0003402 | A1 * | 1/2004 | McKenna, Jr. | G06F 3/0481 |
| | | | | 725/46 |
| 2004/0078814 | A1 * | 4/2004 | Allen | H04N 5/44513 |
| | | | | 725/47 |
| 2008/0052742 | A1 * | 2/2008 | Kopf | H04N 5/44591 |
| | | | | 725/34 |
| 2009/0222754 | A1 * | 9/2009 | Phillips | H04N 21/235 |
| | | | | 715/774 |

* cited by examiner

Primary Examiner — Michael R Telan
(74) Attorney, Agent, or Firm — Lorenz & Kopf LLP

(57) ABSTRACT

A method for viewing video content includes displaying, within a first display region, first video content from a first content source, and receiving a request to display second video content, wherein the second video content comprises only a portion of video content from a second content source (such as a news ticker or "scroll"). The second video content is then simultaneously displayed within a second display region adjacent to the first display region.

11 Claims, 5 Drawing Sheets

SYSTEMS AND METHODS FOR SIMULTANEOUSLY DISPLAYING VIDEO CONTENT FROM MULTIPLE PROGRAMMING SOURCES

CROSS-REFERENCE TO RELATED APPLICATIONS

This application claims priority to U.S. Provisional Patent Application No. 62/440,787, filed Dec. 30, 2016, which is hereby incorporated by reference.

TECHNICAL FIELD

The present invention generally relates to media playing devices, and more particularly relates to systems and methods for simultaneously displaying, on a single monitor, video content from multiple programming sources.

BACKGROUND

Most television viewers now receive their television signals through a content aggregator such as a cable or satellite television provider. For subscribers to a direct broadcast satellite (DBS) service, for example, television programming is received via a broadcast that is sent via a satellite to an antenna that is generally located on the exterior of a home or other structure. Other customers receive television programming through conventional television broadcasts, or through cable, wireless or other media. Programming is typically received at a receiver such as a "set top box" (STB) or other receiver that demodulates the received signals and converts the demodulated content into a format that can be presented to the viewer on a television or other display. In addition to receiving and demodulating television programming, many television receivers are able to provide additional features. Examples of features available in many modern television receivers include electronic program guides (EPGs), digital or other personal video recorders, "place-shifting" features for streaming received content over a network or other medium, providing customer service information and/or the like.

It is often the case that two separate users—each having their own unique preference in television programming—will be simultaneously viewing content on a television display. In such contexts, one user might, for example, prefer to view the nightly news, while the other might prefer to watch a sit-com or other such content. While conventional picture-in-picture (PIP) and split-screen systems allow two shows to be watched simultaneously, the size of the resulting windows are such that the PIP display (or the split screen display) results in a smaller portion of the display used for the main programming and/or portions of one program display being occluded by the other. Accordingly, conventional prior art PIP displays are an unsatisfactory way for two users to simultaneously watch content from multiple programming sources.

It is therefore desirable to create systems and methods for improving the viewer experience by allocating most of the display to one programming source, and a small portion of the display to a portion of another programming source—such as a news ticker, scroll, score box, or the like. These and other desirable features and characteristics will become apparent from the subsequent detailed description and the appended claims, taken in conjunction with the accompanying drawings and this background section.

BRIEF DESCRIPTION OF THE DRAWING FIGURES

Exemplary embodiments will hereinafter be described in conjunction with the following drawing figures, wherein like numerals denote like elements, and FIG. 1 is a block diagram of an exemplary television receiver system;

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Generally speaking, systems and methods in accordance with the present subject matter allow one user to view a portion of content from a first programming source (e.g., a news ticker displayed at the bottom of the screen) while another user is simultaneously viewing another programming source. The user may specify preferred news ticker sources from a list of channels that provide such a source.

Figure 1:
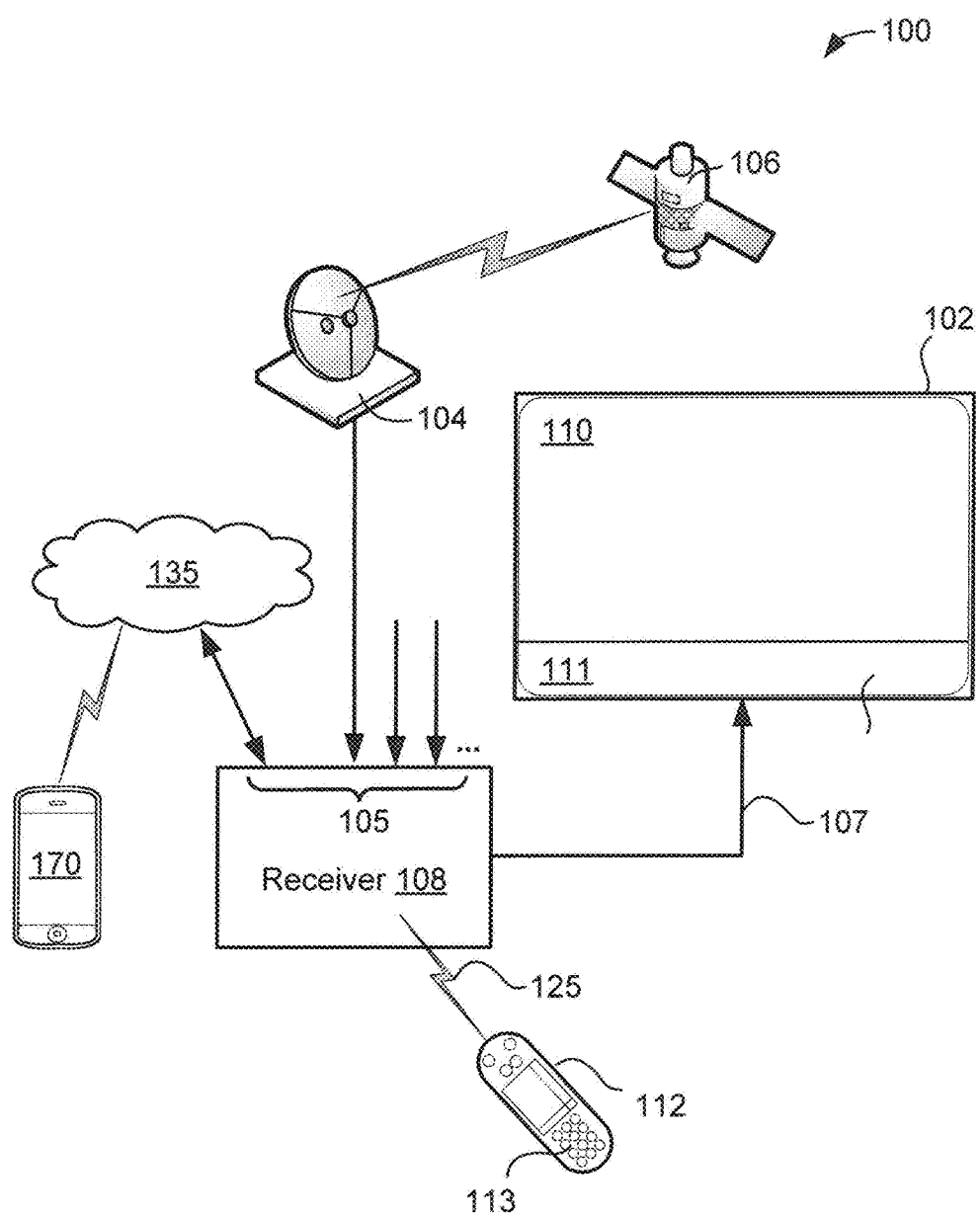

Turning now to the drawing figures and with initial reference to FIG. 1, an exemplary system 100 for presenting television signals to a viewer suitably includes a receiver 108 that receives signals 105 in any format and generates appropriate outputs 107 to generate imagery 110 on display 102. Typically, receiver 108 interacts with signals 125 received from a wireless remote control 112 to present television imagery 110 on display 102 as desired by the viewer. In the exemplary view shown in FIG. 1, imagery 110 includes first video content 110 and second video content 111. To control the displayed content, a viewer typically uses an input feature 113 (e.g., a touchpad, rocker switch or the like) on remote control 112. In some embodiments, a second remote control is used to separately control video content 111 (e.g., to activate a ticker window and/or select the video source from which that ticker window will be sourced).

Receiver 108 may be any component, device or logic capable of receiving and decoding video signals 105. In various embodiments, receiver 108 is a set-top box (STB) or the like capable of receiving satellite, cable, broadcast and/or other signals encoding audio/visual content. Receiver 108 may further demodulate or otherwise decode the received signals 105 to extract programming that can be locally viewed on display 102 as desired. Receiver 108 may also include a content database stored on a hard disk drive, memory, or other storage medium to support a digital or other personal video recorder (DVR/PVR) feature as appropriate. Receiver 108 may also provide place shifting, electronic program guide, multi-stream viewing and/or other features as appropriate.

In the exemplary embodiment illustrated in FIG. 1, receiver 108 is shown receiving digital broadcast satellite (DBS) signals from a satellite 106 at an antenna 104. Equivalent embodiments, however, could receive programming 105 from one or more programming sources, including any sort of satellite, cable or broadcast source, as well as any Internet or other network source (135) or the like. In embodiments that include DVR functionality, programming may be stored in any sort of database as desired (e.g., in response to user/viewer programming instructions) for subsequent viewing. Content may also be received from digital versatile disks (DVDs) or other removable media in some embodiments. A mobile device 170 (e.g., smartphone, laptop computer, netbook, portable video device, etc.) may also be used to display the desired video content and/or to control receiver 108.

Display 102 is any device capable of presenting imagery to a viewer. In various embodiments, display 102 is a conventional television set, such as any sort of television operating in accordance with any digital or analog protocols, standards or other formats. Display 102 may be a conventional NTSC or PAL television receiver, for example. In other embodiments, display 102 is a monitor or other device that may not include built-in receiver functionality, but that is nevertheless capable of presenting imagery in response to signal 107 received from receiver 108. In various embodiments, receiver 108 and display 102 may be physically combined or interconnected in any manner A receiver card, for example, could be inserted into a slot or other interface in a conventional television, or the functionality of receiver 108 may be provided within a conventional television display 102. In other embodiments, signals 107 are transferred between receiver 108 and display 102 using any sort of cable or other interface (including a wireless interface). Examples of common interfaces include, without limitation, component video, S-video, High-Definition Multimedia Interface (HDMI), Digital Visual Interface (DVI), IEEE 1394, and/or any other formats as desired.

Remote control 112 is any sort of control device capable providing signals 125 to receiver 108 that represent inputs received from one or more viewers. Typically, remote control 112 is an infrared, radio frequency (RF) or other wireless remote that includes any number of buttons or other features for receiving viewer inputs. In an exemplary embodiment, remote control 112 communicates with receiver 108 using the IEEE 802.15.4 ("ZIGBEE") protocol, the RF for consumer electronics (e.g., "RF4CE" or "EC Net") protocols, and/or any other standard or non-standard technique for implementing wireless personal area networks (WPANs). Other embodiments may instead communicate using IEEE 802.15.1 ("BLUETOOTH"), IEEE 802.11 ("WI-FI"), conventional infrared, and/or any other wireless techniques. Further, various embodiments of remote control 112 may support multiple communications schemes such both as RF and infrared, or the like.

Remote control 112 generally includes various buttons, sliders, rocker switches and/or other features for receiving physical inputs from the viewer. As the user depresses or otherwise interacts with the features, remote control 112 suitably produces wireless signals 125 in response.

In operation, then, receiver 108 suitably receives television signals 105 from a satellite, cable, network 135, broadcast or other source. In a satellite based embodiment, for example, one or more channels can be extracted from a conventional satellite feed; the video content on the selected channel can be demodulated, extracted and otherwise processed as appropriate to display the desired content to the viewer. One or more cable or broadcast channels may be similarly obtained in any manner In some embodiments, receiver 108 may obtain multiple channel signals 105 from different sources (e.g., one channel from a cable or satellite source and another channel from a terrestrial broadcast, DVD or other source).

Receiver 108 suitably obtains the desired content from the channel(s) indicated by the viewer (e.g., via remote control 112), and presents the content on display 102. In various embodiments, channel changing is facilitates by presenting first content 110 while simultaneously displaying second content 111, wherein second content 111 is a scroll window, news ticker, etc. extracted from second content (i.e., from a channel that is different from that used for first content 110).

Figure 2:
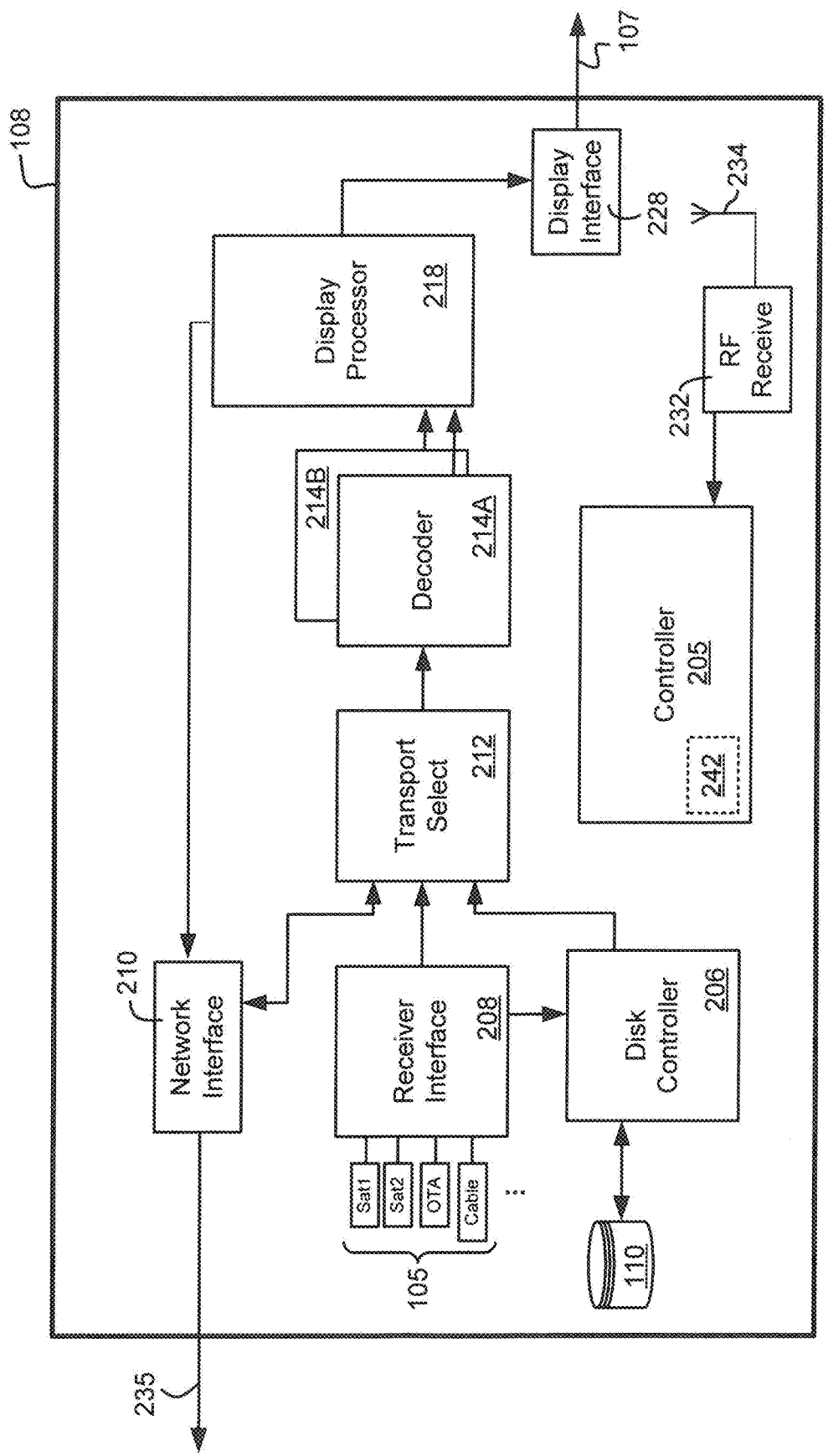
FIG. 2 is a block diagram of an exemplary television receiver device.

FIG. 2 provides additional detail regarding an exemplary receiver 108 that includes a receiver interface 208, a decoder 214 and a display processor 218, as appropriate. FIG. 2 also shows a disk controller interface 206 to a disk or other storage device 110, an interface 210 to a local or wide area network, a transport select module 212, a display interface 228, an RF receiver module and control logic 205. Other embodiments may incorporate additional or alternate processing modules from those shown in FIG. 2, may omit one or more modules shown in FIG. 2, and/or may differently organize the various modules in any other manner different from the exemplary arrangement shown in FIG. 2.

Receiver 108 may be physically and logically implemented in any manner FIG. 2 shows various logical and functional features that may be present in an exemplary device; each module shown in the figure may be implemented with any sort of hardware, software, firmware and/or the like. Any of the various modules may be implemented with any sort of general or special purpose integrated circuitry, for example, such as any sort of microprocessor, microcontroller, digital signal processor, programmed array and/or the like. Any number of the modules shown in FIG. 2, for example, may be implemented as a "system on a chip" (SoC) using any suitable processing circuitry under control of any appropriate control logic 205. In various embodiments, control logic 205 executes within an integrated SoC or other processor that implements receiver interface 208, transport selector 212, decoder(s) 214 (e.g., 214A and 214B), display processor 218, disk controller 206 and/or other features, as appropriate. The Broadcom Corporation of Irvine, Calif., for example, produces several models of processors (e.g., the model BCM 7400 family of processors) that are capable of supporting SoC implementations of satellite and/or cable receiver systems, although products from any number of other suppliers could be equivalently used. In still other embodiments, various distinct chips, circuits or components may be inter-connected and inter-relate with each other to implement the receiving and decoding functions represented in FIG. 2.

Various embodiments of receiver 108 therefore include any number of appropriate modules for obtaining and processing media content as desired for the particular embodiment. Each of these modules may be implemented in any combination of hardware and/or software using logic executed within any number of semiconductor chips or other processing logic.

Various embodiments of control logic 205 can include any circuitry, components, hardware, software and/or firmware logic capable of controlling the various components of receiver 108. Various routines, methods and processes executed within receiver 108 are typically carried out under control of control logic 205 and stored as software instructions 242, as described more fully below. Generally speaking, control logic 205 receives user input signals 125 (FIG. 1) via an RF receiver interface 232 that is able to communicate with the remote control 112 using a suitable antenna 234. Control logic receives user inputs from remote control 112 and/or any other source, and directs the other components of receiver 1ob in response to the received inputs to present the desired imagery (from multiple channels simultaneously) on display 102.

As noted above, receiver 108 suitably includes a receiver interface 208, which includes any hardware, software, firmware and/or other logic capable of receiving media content via one or more content sources 105. In various embodiments, content sources 105 may include cable television, DBS, broadcast and/or other programming sources as appropriate. Receiver interface 208 appropriately selects a desired input source and provides the received content to an appropriate destination for further processing. In various embodiments, received programming may be provided in real-time (or near real-time) to a transport stream select module 212 or other component for immediate decoding and presentation to the user. Alternatively, receiver interface 208 may provide content received from any source to a disk or other storage medium in embodiments that provide DVR functionality. In such embodiments, receiver 108 may also include a disk controller module 206 that interacts with an internal or external hard disk, memory and/or other device that stores content in a database 110, as described above.

In the embodiment shown in FIG. 2, receiver 108 also includes an appropriate network interface 210, which operates using any implementation of protocols or other features to support communication by receiver 108 on any sort of local area, wide area, telephone and/or other network. In various embodiments, network interface 210 supports conventional LAN, WAN or other protocols (e.g., the TCP/IP or UDP/IP suite of protocols widely used on the Internet) to allow receiver 108 to communicate on the Internet or any other network as desired. Network interface 210 typically interfaces with the network using any sort of LAN adapter hardware, such as a conventional network interface card (NIC) or the like provided within receiver 108. The output of display processor 218 may be provided to network interface 210 to produce a signal 235 that can be viewed, for example, on mobile device 170 or another remote computing device (e.g., via placeshifting). Other embodiments may provide interfaces 210 to conventional telephone lines or other communications channels, or may omit network connectivity altogether.

Transport stream select module 212 is any hardware and/or software logic capable of selecting a desired media stream from the available sources. In the embodiment shown in FIG. 2, stream select module 212 is able to generate video signals for presentation on one or more output interfaces 228. Typically, transport select module 212 responds to viewer inputs (e.g., via control logic 205) to simply switch encoded content received from a broadcast, satellite, cable or other source 105 or from storage 110 to one or more decoder modules 214.

Receiver 108 may include any number of decoder modules 214A-B for decoding, decompressing and/or otherwise processing received/stored content as desired. Generally speaking, decoder modules 214A-B decompress, decode and/or otherwise process received content from transport select module 212 to extract an MPEG or other media stream encoded within the stream. The decoded content can then be processed by one or more display processor modules 218 to create a presentation on display 102 (FIG. 1) for the viewer in any appropriate format. FIG. 2 shows two decoder modules 214 operating on television signals received from transport select module 212. In practice, any number of decoder modules 214 may be used, particularly in PIP settings where multiple signals are simultaneously decoded and displayed, or in embodiments wherein channel content is directly scrolled across other channel content. In such embodiments, it may be desirable to receive multiple channels simultaneously to facilitate the rapid scrolling of content on a common display of imagery 110. That is, by simultaneously tuning and decoding content from multiple channels, the scrolling from one channel to the next can be facilitated. Other embodiments, however, may not make use of multiple decoder modules 214, but may instead only decode a single stream at any particular time. The term "decoder", then, may collectively apply to one or more decoder modules that are able to decode one or more signals for presentation on display 104.

Display processor module 218 includes any appropriate hardware, software and/or other logic to create desired screen displays via display interface 228 as desired. Such displays may include combining signals received from one or more decoder modules 214 to facilitate viewing of one or more channels. In various embodiments, display processing module 218 is also able to produce on screen displays (OSDs) for electronic program guide, setup and control, input/output facilitation and/or other features that may vary from embodiment to embodiment. Such displays are not typically contained within the received or stored broadcast stream, but are nevertheless useful to users in interacting with receiver 108 or the like. The generated displays, including received/stored content and any other displays may then be presented to one or more output interfaces 228 in any desired format. The various interface features described herein, for example, may be generated by display processor module 218 operating alone or in conjunction with control logic 205.

Display processor 218 produces an output signal encoded in any standard format (e.g., ITU656 format for standard definition television signals or any format for high definition television signals) that can be readily converted to standard and/or high definition television signals at interface 228. In other embodiments, the functionality of display processor 218 and interface 228 may be combined in any manner.

Figure 3:
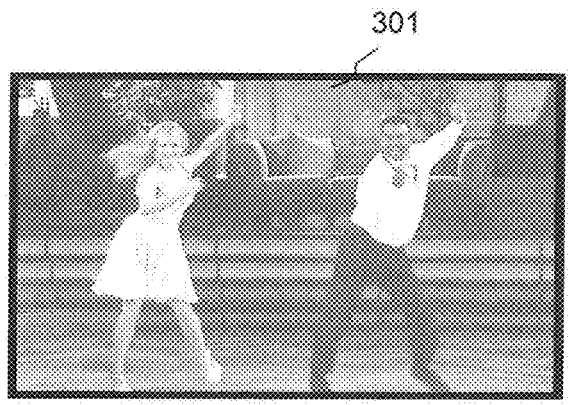
FIGS. 3-6 are diagrams of exemplary screen displays.

FIGS. 3-6 depict various displays that might be produced by the various modules and components illustrated in FIGS. 1 and 2. More particularly, FIG. 3 depicts the video content 301 that might be viewed, full screen, by a user. In this example, video content 301 corresponds to dance-related television programming.

Figure 4:
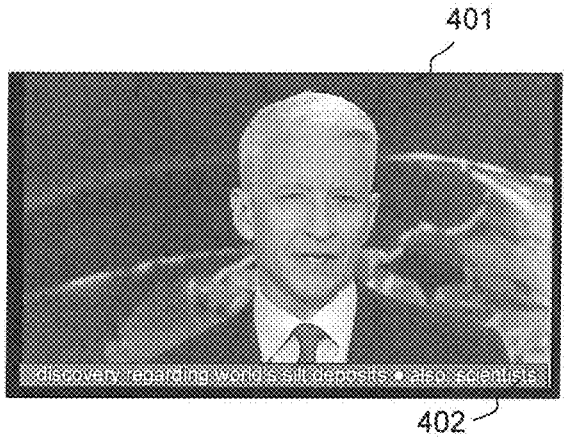

Similarly, FIG. 4 depicts the video content 401 corresponding to a news program (from a different content source) that may be alternatively displayed for a user. As illustrated, video content 401 includes a "news ticker" or "scroll" 402 that includes a scrolling text display including news updates, sports scores, or the like, depending upon the nature of video content 401. News ticker 402 occupies a relatively narrow region near the bottom of the screen within video content 401, as is the case with many news tickers used in connection with various news, sport, and financial programs. In this regard, the phrase "news ticker" is used herein without loss of generality to indicate any text-containing subset of video display that changes over time, including, for example, stock tickers, news tickers, sports scores tickers, and the like. The term "text" as used in this definition is not intended to limit the content to ASCII text, but might include images, emoticons, and other graphics that might not be considered conventional "text."

Figure 5:

In accordance with the present subject matter, a display such as that shown in FIG. 5 may be presented to users, allowing one user to view all or substantially all of video content 301 while a second user is able to view the news ticker 402 from video content 401. With momentary reference to FIG. 2, decoder 214A might be employed to display video content 301, while decoder 214B might be employed to display video content 402. In this regard, decoder 214B might be controlled (via controller 205) to consider only a small portion of video content 402 (e.g., less than 10% of the content) that corresponds to a known location of the desired news ticker. Video content 301 is displayed within a first display region, and video content 402 is displayed within a second display region, wherein the first and second display regions are adjacent to each other.

In accordance with various embodiments, a user may toggle video content 402 on/off, and might also change the news ticker displayed using remote control 112 and/or another remote device (such as an application provided on a smartphone). In other embodiments, module 108 and/or a peripheral device communicatively coupled thereto is able to receive and interpret voice commands from a user and thereby control the display of the news ticker.

Figure 6:

While FIG. 5 illustrates an embodiment in which a portion of video content 301 is cut off at the bottom by the presence of video content 401 (in this case, occluding a view of the dancers' feet), FIG. 6 illustrates an embodiment in which video content 301 has been scaled (horizontally and vertically) such that all of video content 301 is displayed, albeit in slightly smaller form (with vertical bars added along the left and right side, as is known in the art). That is, in FIG. 5, the second display region occludes a portion of the first video content, and in FIG. 6, it does not.

Figures 7, 8:
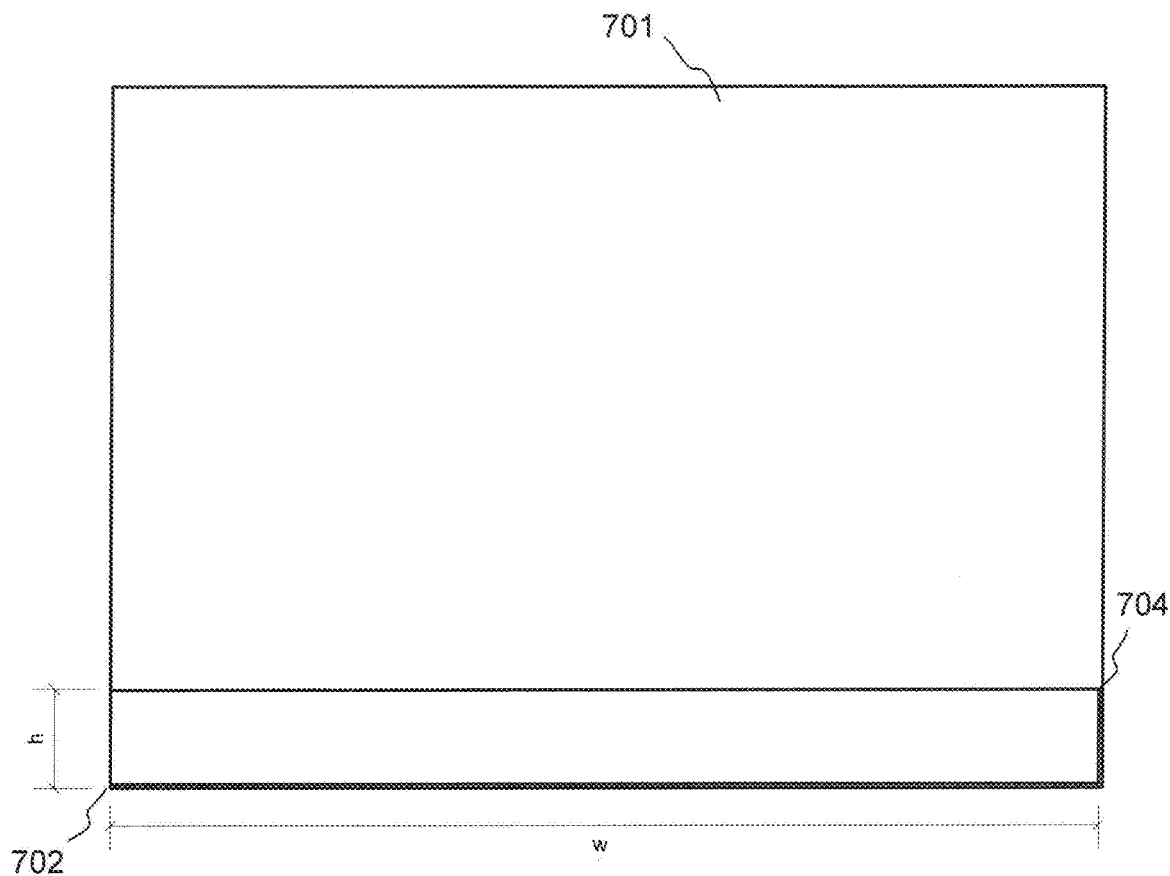
FIG. 7 illustrates a conceptual view of a display layout.
FIG. 8 illustrates an example user interface for specifying preferred news ticker sources.

As mentioned above, module 108 of FIG. 2 (e.g., controller 205 and software instructions 242) preferably knows, a priori, which channels include news tickers, and where those news tickers are located within a program. Such information may be stored, for example, as a look-up table within controller 205. Referring to FIG. 7, for example, it may be known that, for certain video content 701, the news ticker may extend within a rectangular region defined by a first corner 702 and a second corner 704. This region may also be characterized by a known height h and width w relative to a location within video content 701. Such information may be stored by controller 205 as a data structure including a channel identifier (e.g., CNN), along with geometric information specifying the news ticker region (e.g., Cartesian coordinates of points 702 and 704).

As illustrated in the example shown in FIG. 8, the user may be able to specify preferred news tickers 800. That is, during a suitable configuration step (e.g., during a program-discovery procedure, through general setup, or through a user preferences menu), the user may be able to select (in this case, through a check-box user interface) those channels that the user would prefer to watch.

Figure 9:
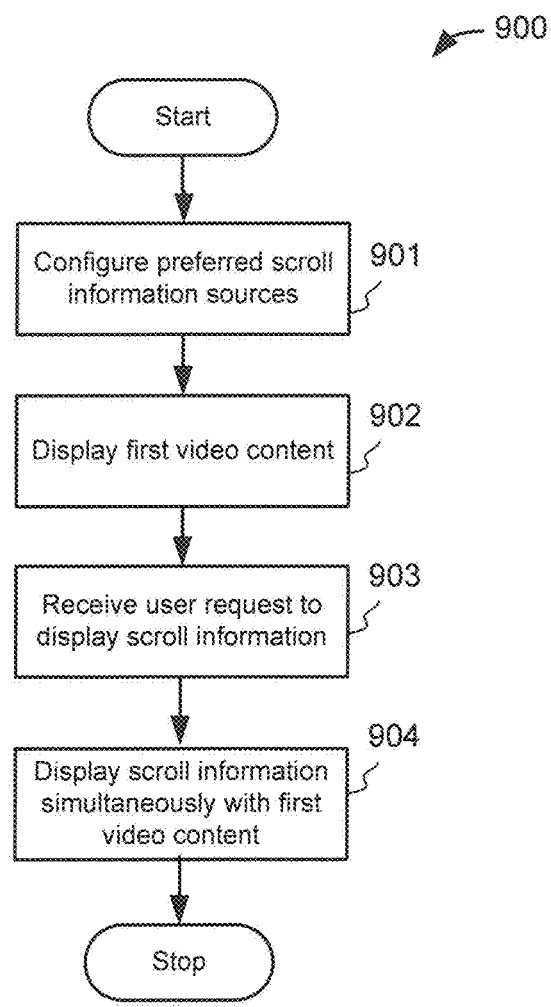
FIG. 9 is a flowchart showing an exemplary process for changing a channel with a television receiver.

FIG. 9 is a flowchart showing a method in accordance with one embodiment. Specifically, the method begins by allowing the user to configure preferred scroll information sources (901), such as via a user interface as shown in FIG. 8. In a default configuration, all available news tickers are selected. Next, in step 902, the first video content is displayed (e.g., as shown in FIG. 3).

Subsequently, at step 903, the system receives a user request to display the news ticker information. At this point, the system might select a default channel to extract the news ticker (e.g., a channel specified by the user), or might select the most-recently displayed news ticker. Finally, in step 904, the news ticker is displayed simultaneously with the first video content. This is shown, for example, in FIG. 5, which illustrates simultaneously display of video content 301 and video content 402 (i.e., a moving news ticker from a second source as shown in FIG. 4).

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. As used herein, the word "exemplary" means "serving as an example, instance, or illustration." Any implementation described herein as exemplary is not necessarily to be construed as preferred or advantageous over other implementations. Various changes may be made in the function and arrangement of elements described without departing from the scope of the invention.

What is claimed is:

1. A method performed utilizing a media device deployed with a memory with a display processor, and coupled to a display device, the display processor configured to execute machine readable software instructions to perform the steps to display content from multiple channels simultaneously, comprising:

facilitating, by the display processor, channel changing, by displaying on a display of the display device, the display content from the multiple channels comprising: a first video content from a first content source while simultaneously displaying a second video content from a second content source configured in at least one region comprising: a scroll window and a ticker region of the display wherein the second video content is from a channel that is different than the first video content;

displaying, by the display processor on the display device, the first video content from the first content source wherein the first video content is displayed in a display region not within the ticker region;

receiving, by the display processor, a user request, to display within the ticker region extracted content from the second video content which is different than the first video content not within the ticker region from displaying simultaneously therewith the first video content on the display;

in response, by the display processor, to a receipt from the user request, recalling from the memory by the display processor, stored geometric information specifying a set of dimensions and a location of at least the region comprising the ticker region for containing the second video content by:

using a look-up table containing the stored geometric information wherein the look-up table is configured with a data structure that comprises a channel identifier for enabling a user to specify a particular news ticker in a configuration step and for enabling the display processor to already identify priori which channels comprise the particular news ticker and where the ticker region is located within a program that is presented;

presenting, by the display processor, on the display device, in the ticker region, the extracted second video content by the display processor defined by the set of dimensions and by the location of the ticker region specified by the stored geometric information in the look-up table, while simultaneously presenting the first video content on the display device not within the specified ticket region wherein the specified ticker region extends within a rectangular region defined by a first corner and a second corner of the set of dimensions comprising: a known height h and width w relative to the location of the ticker region contained in the second video content;

in response to receipt of the user request at the media device, identifying a television channel having a ticker region within the program and most recently viewed by a user of the media device for extracting the ticker region from the identified television channel when presenting the ticker region on the display device; and storing, in the memory in the look-up table contained in the media device, geometric information specifying dimensions and locations of a plurality of ticker regions contained in video content, a first ticker region included in the plurality of ticker regions, and further storing the data structure of the look-up table, a list of channel identifiers and geometric information for the ticker regions corresponding to each channel included in the list of channel identifiers.

2. The method of claim 1, wherein the ticker region contained in the second video content is selected from an identified television channel group consisting of a news ticker, a stock ticker, and a sports score ticker.

3. The method of claim 1, wherein the second video content comprises a total displayed area, and wherein the ticker region occupies less than 10% of the total displayed area of the second content source.

4. The method of claim 1, further comprising:
receiving, at the media device, user input specifying a default television channel for extraction of the ticker region; and
extracting the ticker region from the default television channel when presenting the ticker region on the display device.

5. The method of claim 1, further comprising:
establishing, based upon user input received at the media device, a list of television channels containing ticker regions and identified by the user as user favorites; and
when presenting the ticker region on the display device, selecting a television channel from which to extract the ticker region based, at least in part, on the list of television channels containing ticker regions and identified by the user as user favorites.

6. A video media system to display content from multiple channels simultaneously comprising:
a display device;
a memory storing geometric information specifying dimensions and location of ticker regions contained in video content; and
a controller communicatively coupled to the display device and to the memory, the controller configured to:
facilitate channel changing, by displaying on a display of the display device, the display content from the multiple channels comprising: a first video content from a first content source while simultaneously displaying a second video content from a second content source configured in at least one region comprising: a scroll window and a ticker region of the display wherein the second video content is from a channel that is different than the first video content;
receive a user request to display the ticker region contained in the second video content different than the first video content;
in response to receipt of the user request, recall from the memory, stored geometric information specifying the dimensions and location of the ticker region contained in the second video content by:

using a look-up table containing the stored geometric information wherein the look-up table is configured with a data structure that comprises a channel identifier for enabling a user to specify a particular news ticker in a configuration step and for enabling the display processor to already identify priori which channels comprise the particular news ticker and where the ticker region is located within a program that is presented;
present, on the display device, the ticker region as extracted from the second video content in accordance with the dimensions and location of the ticker region specified by the stored geometric information in the look-up table, while simultaneously operating to continue to display the first video content on the display device wherein the stored geometric information in the look-up table characterize the ticker region by cartesian dimensions of a known height h and a known width w relative to the location of the ticker region contained in the second video content;
in response to receipt of the user request at the media device, identifying a television channel having a ticker region within the program and most recently viewed by a user of the media device for extracting the ticker region from the identified television channel when presenting the ticker region on the display device; and
storing, in the memory in the look-up table contained in the media device, geometric information specifying the dimensions and locations of a plurality of ticker regions contained in video content, and a first ticker region included in the plurality of ticker regions.

7. The video media system of claim 6, wherein the ticker region of the second video content is selected from a group consisting of a news ticker, a stock ticker, and a sports score ticker.

8. The video media system of claim 6, wherein the second video content comprises a total displayed area, and wherein the ticker region occupies less than 10% of the total displayed area of the second content source.

9. Non-transitory computer-readable media bearing software instructions that, when executed by a processor contained in a media device to display content from multiple channels simultaneously, cause the processor to:
facilitate, by the processor, channel changing, by displaying on a display of the display device, the display content from the multiple channels comprising: a first video content from a first content source while simultaneously displaying a second video content from a second content source configured in at least one region comprising: a scroll window and a ticker region of the display wherein the second video content is from a channel that is different than the first video content;
receive a user request, at the media device, to display a ticker region contained in second video content different than the first video content;
store, in a look-up table in a memory, geometric information wherein the look-up table is configured with a data structure that comprises a channel identifier to enable a user to specify a particular news ticker in a configuration step and to enable the processor to already identify priori which channels comprise the particular news ticker and where the ticker region is located within a program that is presented;
in response to receipt of the user request at the media device, recalling stored geometric information from the look-up table specifying dimensions and location of the ticker region contained in the second video content, the stored geometric information recalled from the memory further contained in the media device;

present, on the display device, the ticker region as extracted from the second video content by the media device in accordance with the dimensions and location of the ticker region specified by the stored geometric information, while simultaneously continuing to display the first video content on the display device wherein the stored geometric information characterize the ticker region by cartesian coordinates of a known height h and a known width w relative to the location of the ticker region contained in the second video content;

in response to receipt of the user request at the media device, identify a television channel from channel identifier and location data in the look-up table having a ticker region and most recently viewed by a user of the media device; and storing, in the memory in the look-up table contained in the media device, geometric information specifying the dimensions and locations of a plurality of ticker regions contained in video content, a first ticker region included in the plurality of ticker regions.

10. The non-transitory computer-readable media of claim 9, wherein the ticker region of the second video content is selected from a group consisting of a news ticker, a stock ticker, and a sports score ticker.

11. The non-transitory computer-readable media of claim 9, wherein the second video content comprises a total displayed area, and wherein the ticker region occupies less than 10% of the total displayed area of the second content source.

* * * * *